United States Patent
Inagaki

(10) Patent No.: US 7,446,808 B2
(45) Date of Patent: Nov. 4, 2008

(54) IMAGE SENSING APPARATUS AND CONTROL METHOD THEREOF HAVING A REDUCED FOCUSING PROCESSING

(75) Inventor: Atsushi Inagaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 849 days.

(21) Appl. No.: 09/853,197

(22) Filed: May 11, 2001

(65) Prior Publication Data

US 2002/0003956 A1 Jan. 10, 2002

(30) Foreign Application Priority Data

May 12, 2000 (JP) .............................. 2000-140234

(51) Int. Cl.
*H04N 5/222* (2006.01)
*H04N 5/225* (2006.01)

(52) U.S. Cl. .................................. 348/333.01; 348/372

(58) Field of Classification Search ......... 348/345–357, 348/333.01–333.11, 372, 240.2; 396/374, 396/121, 122, 123, 124
See application file for complete search history.

(56) References Cited

U.S. PATENT DOCUMENTS 6,130,420 A * 10/2000 Tanaka et al. ............ 250/208.1
6,700,607 B1 * 3/2004 Misawa ................... 348/230.1
6,757,020 B1 * 6/2004 Kikuchi ................. 348/333.01
6,882,369 B1 * 4/2005 Ito ............................ 348/345
6,972,799 B1 * 12/2005 Hashimoto .................. 348/350

FOREIGN PATENT DOCUMENTS

EP 650292 A1 * 4/1995

* cited by examiner

*Primary Examiner*—Justin P Misleh
(74) *Attorney, Agent, or Firm*—Morgan & Finnegan, LLP

(57) ABSTRACT

An image sensing apparatus includes an image sensor; an image display device; a display designating unit that designates whether or not the sensed image is displayed by the image display device; and a focus evaluating value obtaining device that obtains a focus evaluating value for adjusting a focus. The focus evaluating value obtaining device obtains the focus evaluating value based on an image signal that corresponds to a part of a region of an display image displayed by the image display device if the display designating unit does not designate that the sensed image is displayed by the image display device when the image of the subject is sensed by said image sensor.

9 Claims, 6 Drawing Sheets

IMAGE SENSING APPARATUS AND CONTROL METHOD THEREOF HAVING A REDUCED FOCUSING PROCESSING

FIELD OF THE INVENTION

The present invention relates to an image sensing apparatus such as an electronic camera and a control method thereof.

BACKGROUND OF THE INVENTION

Conventionally, an image sensing apparatus such as an electronic camera is known which records and reproduces a still picture or an moving picture with a recording medium such as a memory card having a solid state memory device as a recording medium. Some type of such an apparatus is provided with not only an optical finder (OVF) but also an electronic finder composed of a color liquid crystal panel or the like.

This image sensing apparatus is configured such that an image of a subject is sensed by an image sensing device such as a CCD to obtain an image signal, and processing such as auto-focus (AF) control, automatic exposure (AE) control and auto-white balance (AWB) are performed using the signal. In order to display a favorable moving picture on the electronic finder, it is necessary to supply an image signal in the order of 60 frames per second. In addition, in the case in which a still picture is sensed, it is important not to miss timing for releasing a shutter. For this purpose, the above-mentioned processing such as AF control, AE control and AWB control is required to be performed at a high speed.

However, focusing cannot always be attained using an image signal of one frame and an AF control operation is performed using an image signal of a plurality of frames with the above-mentioned conventional image sensing apparatus. Thus, there is a problem in that the AF control processing takes long and, as a result, the interval between the time when a shutter button is pressed and the time when an image of a subject is actually sensed (shutter time lag) tends to be long.

SUMMARY OF THE INVENTION

The present invention has been achieved in order to solve the above-mentioned problem of the conventional art. It is an object of the present invention, for example, to reduce burdens of focusing processing in sensing an image, which does not require image display, and to shorten the shutter time lag.

According to the present invention, there is provided an image sensing apparatus, comprising:

an image sensor that senses an image of a subject to obtain an image signal;

an image display device that is capable of displaying a sensed image based on said image signal obtained by said image sensor;

a display designating unit that designates whether or not said sensed image is displayed by said image display device when the image of the subject is sensed by said image sensor; and a focus evaluating value obtaining device that obtains a focus evaluating value for adjusting a focus based on said image signal obtained by said image sensor, said focus evaluating value obtaining device obtaining said focus evaluating value based on an image signal which is obtained by said image sensor and corresponds to a part of a region of an display image displayed by said image display device, if said display designating unit does not designate that said sensed image is displayed by said image display device when the image of the subject is sensed by said image sensor.

According to the present invention, there is also provided a control method of an image sensing apparatus, comprising:

an image sensing step that senses an image of a subject to obtain an image signal;

an image displaying step that is capable of displaying a sensed image based on said image signal obtained by said image sensing step;

a display designating step that designates whether or not said sensed image is displayed by said image displaying step when the image of the subject is sensed by said image sensing step; and a focus evaluating value obtaining step that obtains a focus evaluating value for adjusting a focus based on said image signal obtained by said image sensing step, said focus evaluating value obtaining step obtaining said focus evaluating value based on an image signal which is obtained by said image sensing step and corresponds to a part of a region of an display image displayed by said image displaying step if said display designating step does not designate that said sensed image is displayed by said image displaying step when the image of the subject is sensed by said image sensing step.

According to the present invention, there is also provided a storage medium in which a control program of an image sensing apparatus is stored, wherein said control program comprises:

a code of an image sensing step that obtains an image signal by sensing an image of a subject;

a code of an image displaying step that is capable of displaying a sensed image based on said image signal obtained in said image sensing step;

a code of a display designating step that designates whether or not the sensed image is displayed by said image displaying step when an image of the subject is sensed by said image sensing step; and a code of a focus evaluating value obtaining step that obtains a focus evaluating value for adjusting a focus based on said image signal obtained by said image sensing step, said focus evaluating value obtaining step obtaining said focus evaluating value based on an image signal which is obtained by said image sensing step and corresponds to a part of a region of an display image displayed by said image displaying step if said display designating step does not designate that said sensed image is displayed by said image displaying step when the image of the subject is sensed by said image sensing step.

According to the present invention, there is also provided an image sensing apparatus, comprising:

an image sensor for sensing an image of a subject to output an image signal;

a display for displaying a sensed image based on said image signal;

a designation unit for designating whether or not said sensed image is displayed by said display when an image is sensed by said image sensor; and a calculation unit for calculating a focus evaluating value for focus adjustment based on said image signal, wherein said calculation unit calculates said focus evaluating value based on a part of said image signal if said designation unit designates not to display said sensed image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
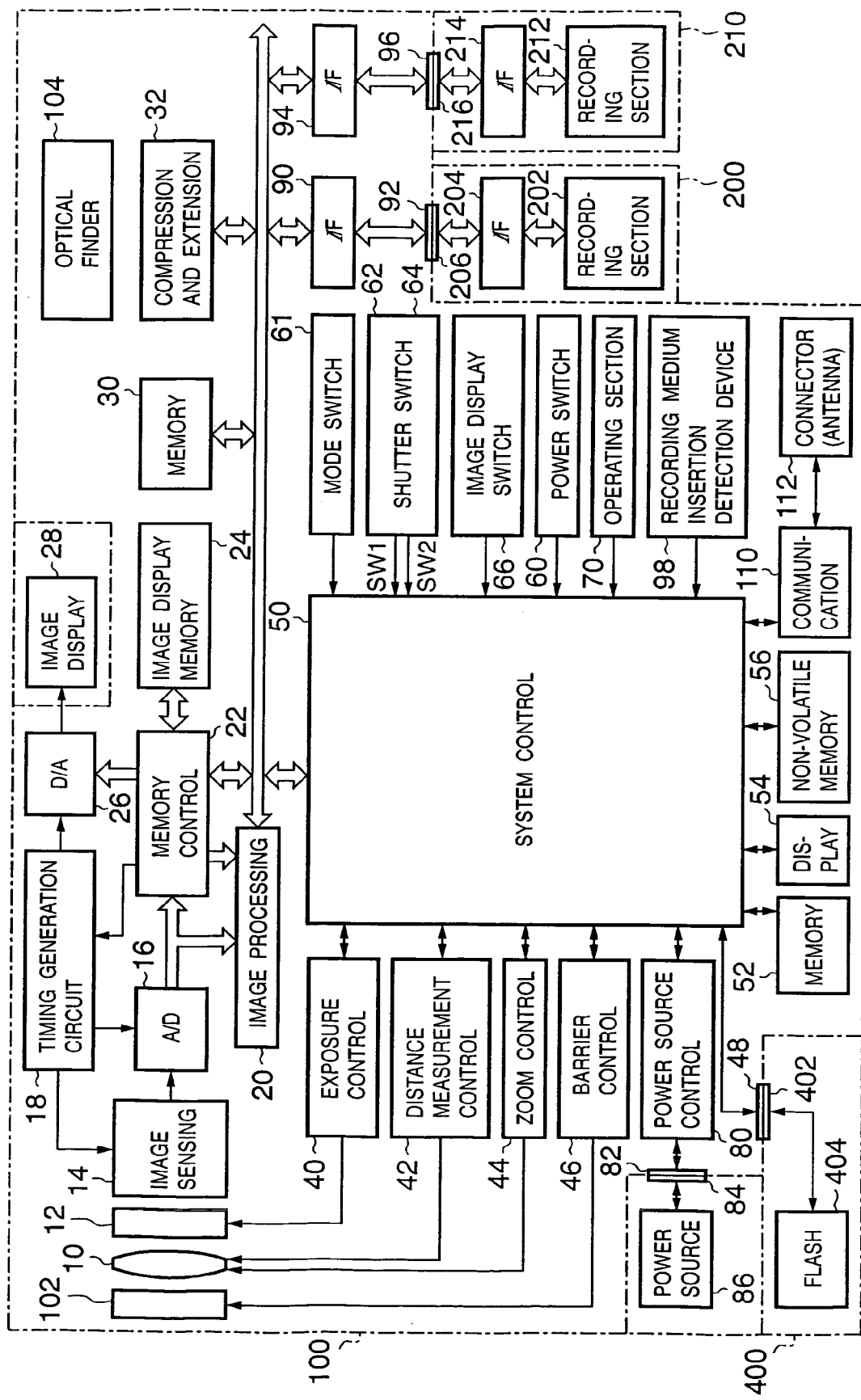
FIG. 1 is a block diagram showing an example of a configuration of an image sensing apparatus in accordance with an embodiment of the present invention.
Figure 2:
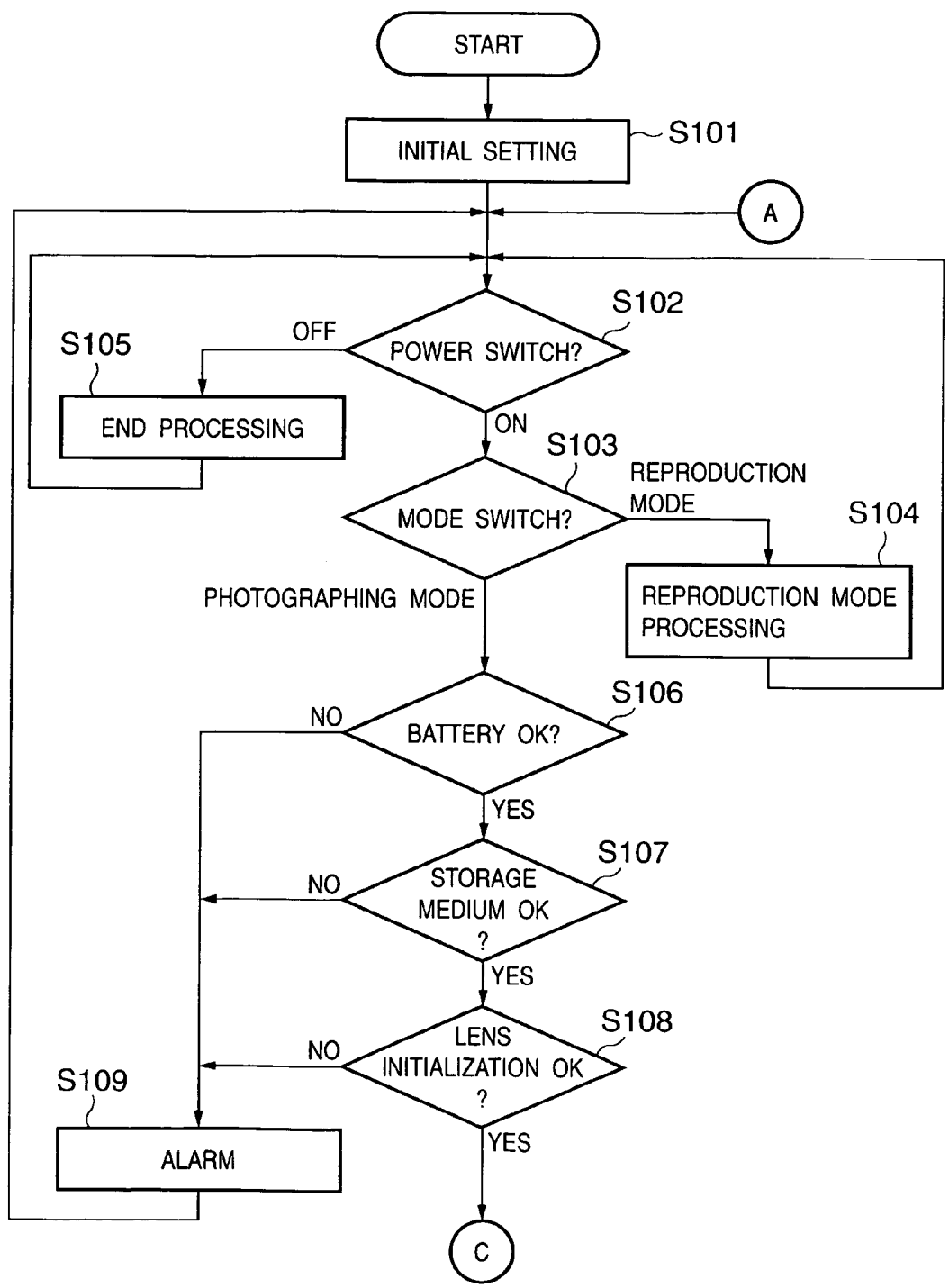
FIGS. 2 to 5 show a flow chart of image sensing processing in the image sensing apparatus.

FIG. 1 is a block diagram showing a configuration of an image sensing apparatus in accordance with an embodiment of the present invention. This apparatus is configured, for example, as an electronic camera.

In the drawing, reference numeral 100 denotes an image processing apparatus (image sensing apparatus), reference numeral 10 denotes a photographing lens consisting of a zoom lens and a focus lens, reference numeral 12 denotes a shutter provided with a focusing function, and reference numeral 14 denotes an image sensing device, which converts an optical image to an electric signal. Reference numeral 16 denotes an A/D converter, which coverts an analog signal output of the image sensing device 14 to a digital signal. Reference numeral 18 denotes a timing generation circuit, which supplies a clock signal and a control signal to the image sensing device 14 and the A/D converter 16 and is controlled by a memory control circuit 22 and a system control circuit 50.

Reference numeral 20 denotes an image processing circuit, which applies predetermined pixel interpolation processing or color conversion processing with respect to data form the A/D converter 16 and data from the memory control circuit 22. In addition, in the image processing circuit 20, predetermined operation processing is performed using the sensed image data. In addition, AF (auto focus) processing of the TTL (Through the Lens) method in which the system control circuit 50 applies control with respect to an exposure control section 40 and a distance measurement control section 42 based on a result found by the operation, AE (automatic exposure) processing and EF (flash pre-light emission) processing are performed. Moreover, in the image processing circuit 20, predetermined operation processing is performed using the sensed image data, and AWB (Auto White Balance) processing of the TTL method based on a result found by the operation is also performed.

Reference numeral 22 is a memory control circuit, which controls the A/D converter 16, the timing generation circuit 18, the image processing circuit 20, an image display memory 24, a D/A converter 26, a memory 30 and a compression and extension circuit 32.

Data of the A/D converter 16 is written in the image display memory 24 or the memory 30 via the image processing circuit 20 and the memory control circuit 22 or directly through the memory control circuit 22.

Reference numeral 24 denotes the image display memory, reference numeral 26 denotes the D/A converter and reference numeral 28 denotes an image display consisting of a TFT-LCD (thin film transistor-liquid crystal display) or the like. Image data for display written in the image display memory 24 is displayed by the image display 28 via the D/A converter 26. If sensed image data is sequentially displayed using the image display 28, it is possible to realize an electronic finder function. In addition, the image display 28 can arbitrarily turn on/off display according to an instruction of the system control circuit 50, and power consumption of the image processing apparatus 100 can be significantly reduced if display is turned off.

Reference numeral 30 denotes the memory for storing photographed still pictures, moving pictures and voice data, and is provided with a storage capacity sufficient for storing a predetermined number of still pictures and a predetermined length of time of moving pictures. Thus, even in the case of continuous photographing for photographing a plurality of still pictures continuously or panoramic photographing, it is possible to write images in the memory 30 at high speed and in large quantity. In addition, the memory 30 can also be used as a work area of the system control circuit 50.

Reference numeral 32 denotes the compression and extension circuit for compressing or extending image data by adoptive discrete cosine conversion (ADCT) or the like. The compression and extension circuit 32 reads an image stored in the memory 30 to apply compression processing or extension processing to it, and then writes the processed data in the memory 30.

Reference numeral 40 denotes the exposure control section, which controls the shutter 12 and has a flash adjustment function by linking with a flash 404. Reference numeral 42 denotes the distance measurement control section, which controls focusing of the photographing lens 10. The exposure control section 40 and the distance measurement control section 42 are controlled using the TTL method. The system control circuit 50 controls the exposure control section 40 and the distance measurement control section 42 based on a result of operation found by operating sensed image data by the image processing circuit 20.

Reference numeral 44 denotes a zoom control section, which controls zooming of the photographing lens 10. Reference numeral 46 denotes a barrier control section, which controls operation of a protective section 102 being a barrier. Reference numeral 48 denotes a connector, which is also called an accessory shoe and is provided with an electric contact with the flash apparatus 400 and a mechanical solid-state device together.

Reference numeral 50 denotes the system control circuit, which controls the entire image processing apparatus 100. Reference numeral 52 denotes a memory, which stores constants, variables, programs or the like for operation of the system control circuit 50.

Reference numeral 54 denotes a display section such as a liquid crystal display device and a speaker, which displays an operational state, a message or the like using characters, images, voices or the like according to execution of a program in the system control circuit 50. This display section 54 is installed at a single or a plurality of places in the vicinity of an operating section of the image processing apparatus 100 where it can be easily recognized visually. The display section 54 is composed of a combination of, for example, an LCD (liquid crystal display) or an LED (light emitting diode), a sounding device or the like.

Reference numeral 56 denotes an electrically erasable and recordable non-volatile memory. For example, EEPROM (electrically erasable and programmable read only memory) or the like is used. Reference numerals 60, 61, 62, 64, 66 and 70 are operating sections, which are used for inputting various operation instruction signals of the system control circuit 50. The operating sections are composed of one of or a combination of a plurality of a switch, a dial, a touch panel, a pointing by visual detection, an voice recognition apparatus or the like.

These operating sections 60, 61, 62, 64, 66 and 70 will now be described in detail.

Reference numeral 60 denotes a power switch for turning on and off a power source of the image processing apparatus 100. Reference numeral 61 is a mode dial switch, which can switch and set various function modes such as an image sensing mode such as an automatic photographing mode, a manual photographing mode and a panoramic photographing mode, and a reproduction mode.

Reference numeral 62 denotes a shutter switch (SW1), which is turned on during the operation of a not-shown shutter button, and instructs start of operation such as the AF (auto focus) processing, the AE (automatic exposure) processing, the AWB (auto white balance) processing and the EF (flash pre-light emission).

Reference numeral 64 denotes a shutter switch (SW2), which is turned on upon completion of the operation of the above-mentioned not-shown shutter button. The shutter switch 64 instructs start of operation of a series of processing consisting of exposure processing for writing image data in the memory 30 by converting a signal read out from the image sensing device 12 through the A/D converter 16 and the memory control circuit 22, development processing using operation in the image processing circuit 20 or the memory control circuit 22, and recording processing for reading out image data from the memory 30, compressing the image data in the compression and extension circuit 32 and writing the image data in a recording medium 200 and a recording medium 210.

Reference numeral 66 denotes an image display on/off switch, which can set on/off of the image display 28. With this function, power consumption can be reduced by blocking current supply to the image display consisting of the TFT-LCD or the like when an image is sensed using an optical finder 104. Further, the setting of on/off of the image display 28 is stored in the memory 52 as an image display flag (on/off). The setting of the image display flag can be performed by the operating section 70 as a user desires. Further, The setting of on/off of the image display 28 may be stored in an internal memory of the system control circuit 50.

Further, zooming of the image sensing device 10 is instructed by a not-shown zoom switch.

Reference numeral 70 denotes an operating section consisting of various buttons, touch panels or the like. The operating section 70 includes a menu button, a set button, a macro button, a multi screen reproduction page feed button, a flash setting button, a single shot/continuous shot self timer switching button, a menu shift/+ (plus) button, a menu shift − (minus) button, a reproduction image shift + (plus) button, a reproduction image shift − (minus) button, a menu shift up button, a menu shift down button, a photographing quality selection button, an exposure correction button, a data/time setting button or the like.

Reference numeral 80 denotes a power source control section, which is composed of a battery detection circuit, a DC-DC converter, a switch circuit for switching a block to be energized, or the like. The power source control section 80 detects loading of a battery, a type of a battery and a residual battery capacity, controls the DC-DC converter based on the detection result and an instruction of the system control circuit 50, and supplies necessary voltage to each section including the recording media 200 and 210 for a necessary period.

Reference numerals 82 and 84 are connectors. Reference numeral 86 is a power source, which consists of a primary battery such as an alkaline battery or a lithium battery, a secondary battery such as an NiCd battery, an NiMH battery or an Li battery, an AC adopter or the like.

Reference numerals 90 and 94 are interfaces with the recording media 200 and 210 such as a memory card and a hard disk, and reference numerals 92 and 96 are connectors for connecting with the recording media 200 and 210 such as a memory card and a hard disk.

Reference numeral 98 is a recording medium insertion detection device, which detects whether or not the recording medium 200 or the recording medium 210 is inserted in the connector 92 or the connector 96.

Further, this embodiment is described assuming that there are two systems of interfaces and connectors to which recording media are inserted. It is needless to mention that an interface and a connector in which a recording medium is inserted may be configured to be provided with either a single or a plurality of systems. In addition, an interface and a connector may be configured to be provided with different standards of interfaces and connectors in combination.

The interface and the connector may be configured using a medium conforming to a standard such as a PCMCIA card, a CF (compact flash) card or the like. In addition, if the interfaces 90 and 94 and the connectors 92 and 96 are configured using media conforming to a standard such as a PCMCIA card, a CF (compact flash) card or the like, image data and management information accompanying the image data can be transferred to and from other computers, peripheral equipment such as printers or the like by connecting various communication cards such as an LAN card, a modem card, a USB card, an IEEE1394 card, a P1284 card, an SCSI card and a communication card such as PHS.

Reference numeral 102 denotes the protective section 102 being a barrier, which covers an image sensing section including the photographing lens 10 of the image processing apparatus 100, and thereby prevents stain or damage of the image sensing section. Reference numeral 104 is an optical finder, which can perform photographing using only this optical finder 104 without using an electronic finder function by the image display 28. In addition, a part of the function of the display section 54, for example, a focusing display function, a hand-shake alarm display function, a flash charge display function, a shutter speed display function, a focusing value display function and an exposure correction display function are provided in the optical finder 104.

Reference numeral 110 denotes a communication section, which has various communication functions such as an RS232C, a USB, an IEEE1394, a P1284, an SCSI, a modem, an LAN and wireless communication. Reference numeral 112 is a connector or an antenna. It is a connector if the image processing apparatus 100 is connected with other apparatuses by the communication section 110, and is an antenna in the case of wireless communication.

Reference numeral 200 is the recording medium such as a memory card and a hard disk. This recording medium 200 is provided with a recording section 202 composed of a semiconductor memory, a magnetic disk or the like, an interface (I/F) 204 with the image processing apparatus 100, and a connector 206 for connecting with the image processing apparatus 100.

Reference numeral 210 denotes a recording medium such as a memory card and a hard disk. This recording medium 210 is provided with a recording section 212 composed of a semiconductor memory, a magnetic disk or the like, an interface (I/F) 214 with the image processing apparatus 100, and a connector 216 for connecting with the image processing apparatus 100.

Reference numeral 400 denotes a flash device. Reference numeral 402 denotes a connector, which connects with an accessory shoe of the image processing apparatus 100. Reference numeral 404 is a flash, which has a projecting function of AF auxiliary light and a flash adjusting function.

In such a configuration, if the image processing apparatus 100 is in the image sensing mode by the mode dial switch 60, it is possible to sense an image using the shutter switch (SW1) 62 and the shutter switch (SW2) 64. The system control circuit 50 is usually in a photographing preparation state. When it is detected that the shutter switch (SW1) 62 is pressed, the exposure control is applied by the exposure control section 40 and, at the same time, the distance measurement control is applied by the distance measurement section 42. When these controls are completed, the system control circuit 50 shifts to an exposure starting state. Then, when it is detected that the shutter switch (SW2) 64 is pressed in this state, exposure is started. A sensed image obtained by photographing is stored in the memory 30 via the image sensing device 14, the A/D converter 16, the image processing circuit 20 and the memory control circuit 22. The recorded image stored in the memory 30 is applied data compression by the compression and extension circuit 32 if necessary, and is stored in the memory 30 again. The system control circuit 50 is in the photographing end state here.

FIGS. 2 to 5 shows a flow chart of image sensing processing in this embodiment.

First, the system control circuit 50 initializes flags and control variables by an initial setting, that is, by turning on a power source such as exchanging a battery (step S101). Then, the system control circuit 50 checks the state of the power switch 60 to determine whether or not the power switch 60 is set at ON (step S102). If it is determined that the power switch 60 is set at OFF as a result of the determination, end processing is executed (step S105). That is, predetermined end processing is performed such as changing display of each display section to the end state, closing the barrier of the protective section 102 to protect the image sensing section, recording parameters, set values and set modes including a flag, control variables or the like in the non-volatile memory 56, and blocking an unnecessary power source of each section of the image processing apparatus 100 including the image display 28 by the power source control section 80. The processing thereafter returns to the step S102.

On the other hand, if it is determined that the power switch 60 is set at ON as a result of the determination of the step S102, the system control circuit 50 checks the set position (the photographing mode or the reproduction mode) of the mode dial switch 61, and determines whether or not the mode dial switch 61 is set at the photographing mode (step S103). If it is determined that the mode dial switch 61 is set at the reproduction mode as a result of the determination, the system control circuit 50 executes the reproduction mode processing (step S104), and the processing returns to the step S102.

On the other hand, if it is determined that the mode dial switch 61 is set at the photographing mode, the system control circuit 50 determines by the power source control section 80 whether or not there is a hindrance to operation of the image processing apparatus 100 judging from the residual capacity of the power source 86 and an operational state (step S106) If it is determined that there is a hindrance to operation of the image processing apparatus 100 as a result of the determination, the processing advances to step S109. On the other hand, if it is determined that there is no hindrance to operation of the image processing apparatus 100, the system control circuit 50 determines whether or not there is a hindrance to operation of the image processing apparatus 100, in particular to record reproduction operation of image data for each of the recording media 200 and 210 judging from the operational state of the recording medium 200 or the recording medium 210 (step S107). If it is determined that there is a hindrance to operation of the image processing apparatus 100 as a result of the determination, the processing advances to step S109. On the other hand, if it is determined that there is no hindrance to operation of the image processing apparatus 100, the system control circuit 50 initializes the photographing lens 10 to determine whether or not the photographing lens 10 operates normally (step S108). If it is determined that the photographing lens 10 does not operate normally as a result of the determination, the processing advances to step S109.

In step S109, the system control circuit 50 performs predetermined alarming display by images and voices using the display section 54 or the like. Then, the processing returns to step S102.

Figure 3:
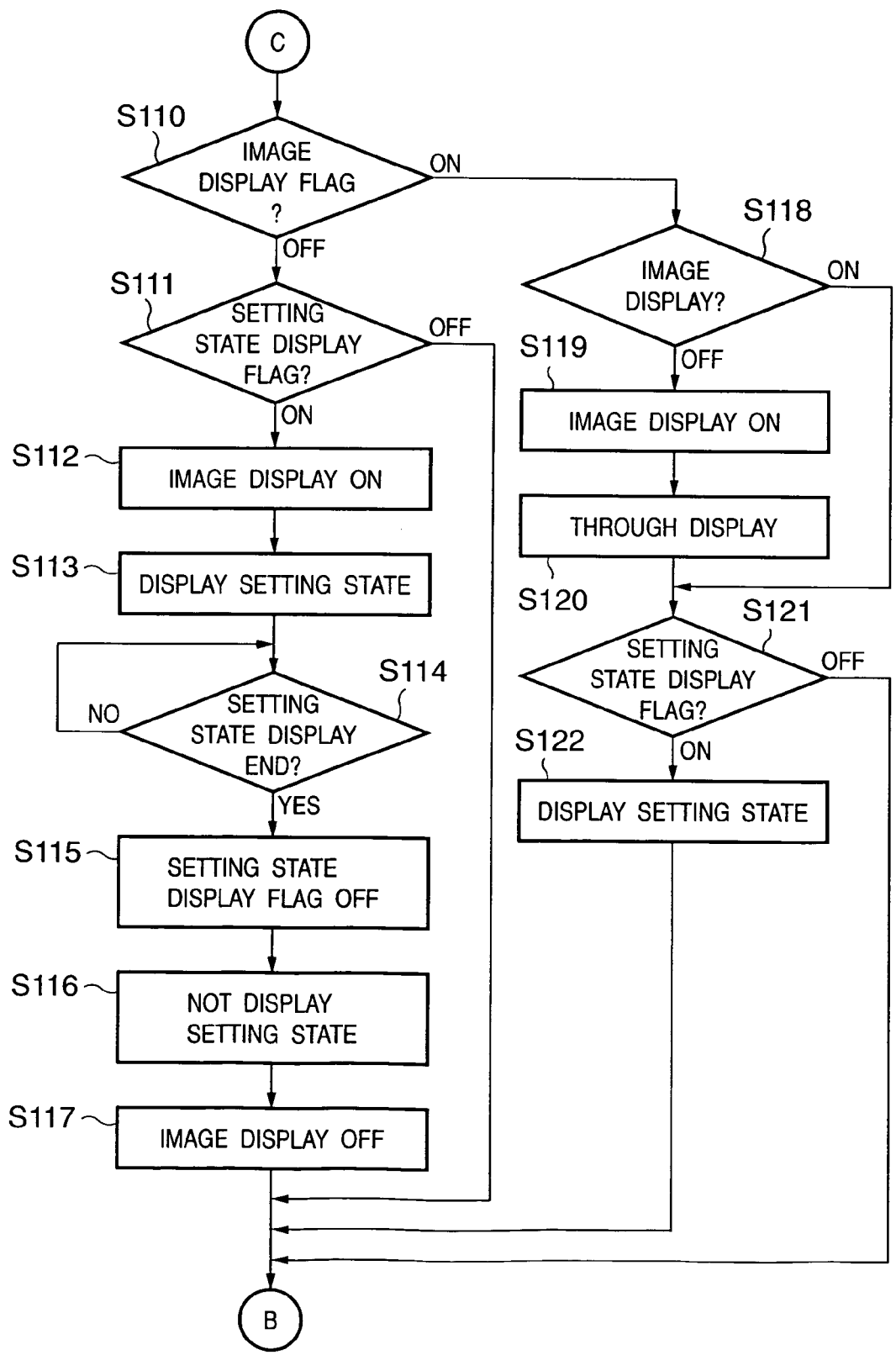

On the other hand, if it is determined that the photographing lens 10 operates normally as a result of the determination of the step S108, the system control circuit 50 determines whether or not an image display flag is set at ON (step S110 of FIG. 3). If it is determined that the image display flag is set at ON as a result of the determination, the system control circuit 50 checks an image display state of the image display 28 to determine whether or not the image display 28 is in the image display ON state (step S118).

If it is determined that the image display 28 is not in the image display ON state as a result of the determination, the system control circuit 50 brings the image display 28 to the image display ON state (step S119) and then a through display state, that is, a state in which sensed image data is sequentially displayed (step S120), and the processing advances to step S121. On the other hand, if it is determined that the image display 28 is in the image display ON state, the processing advances to the step S121 immediately. Further, in the above-mentioned through display state, data sequentially written in the image display memory 24 via the image sensing device 14, the A/D converter 16, the image processing circuit 20 and the memory control circuit 22 is sequentially displayed by the image display 28 via the memory control circuit 22 and the D/A converter 26. Thus, the electronic finder function is realized.

In the following step S121, the system control circuit 50 determines whether or not the setting state display flag is set at ON. If it is determined that the setting state display flag is set at ON as a result of the determination, the system control circuit 50 display the setting state on the image display 28 (step S122), the processing advances to step S131 of FIG. 4. On the other hand, if it is determined that the setting state display flag is not set at ON, the processing advances to the step S131.

If it is determined that the image display flag is not set at ON (is set at OFF) as a result of the determination of the step S110, the system control circuit 50 determines whether or not the setting state display flag is set at ON (step Sill). If it is determined that the setting state display flag is not set at ON as a result of the determination, the processing advances to the step S131. On the other hand, if it is determined that the setting state display flag is set at ON, the system control circuit brings the image display 28 to the image display ON state (step S112), displays the setting state on the image display 28 (step S113), and determines whether or not the setting state display end time set in advance has come (step S114). Then, the determination is continued until the setting state display end time comes and, if the setting state display end time comes, the setting state display flag is set at ON (step S115), the setting state in the image display 28 is set at a non-display state (step S116), the image display 28 is set at the image display OFF state (step S117), and the processing advances to the step S131.

Figure 4:
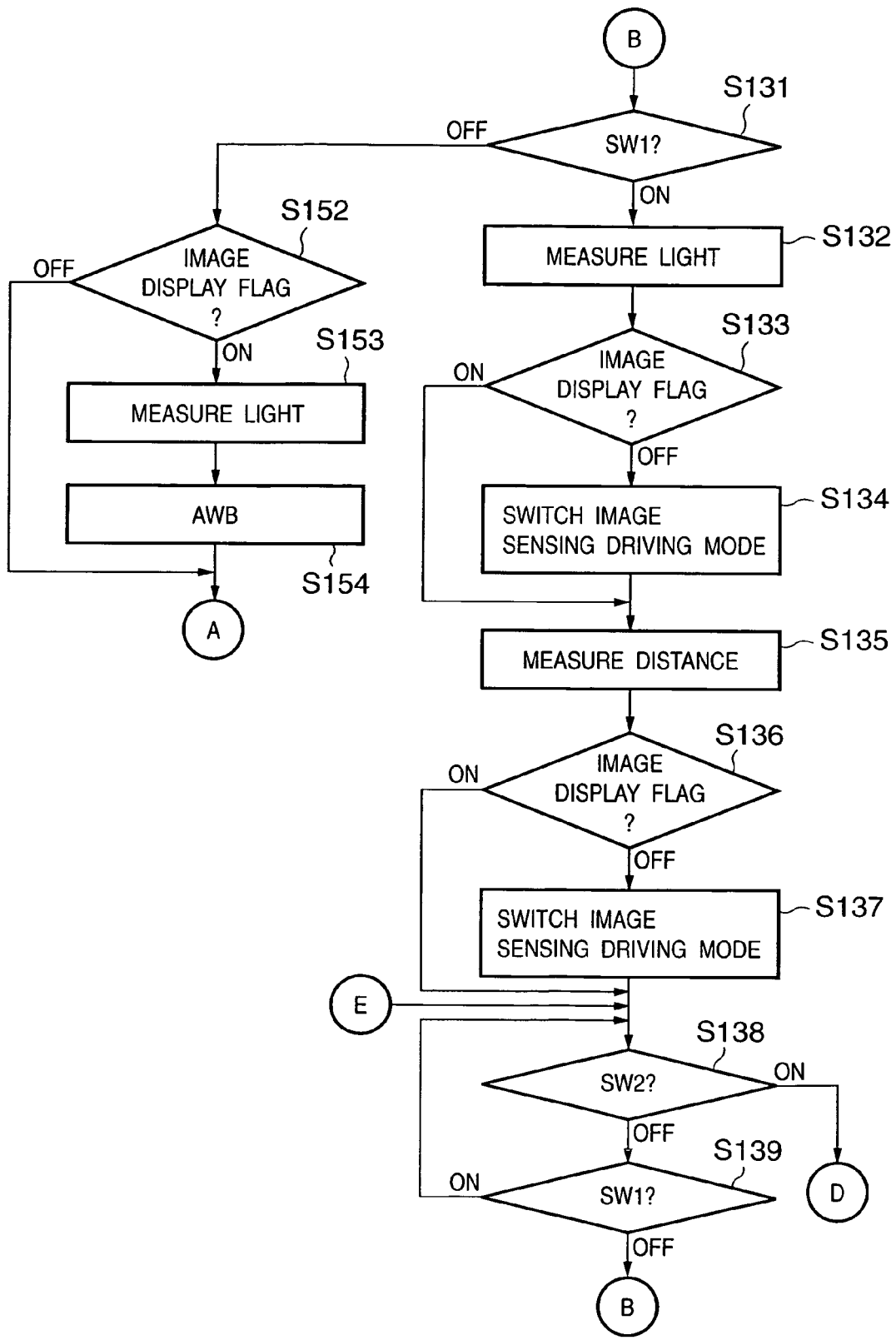
Figure 5:
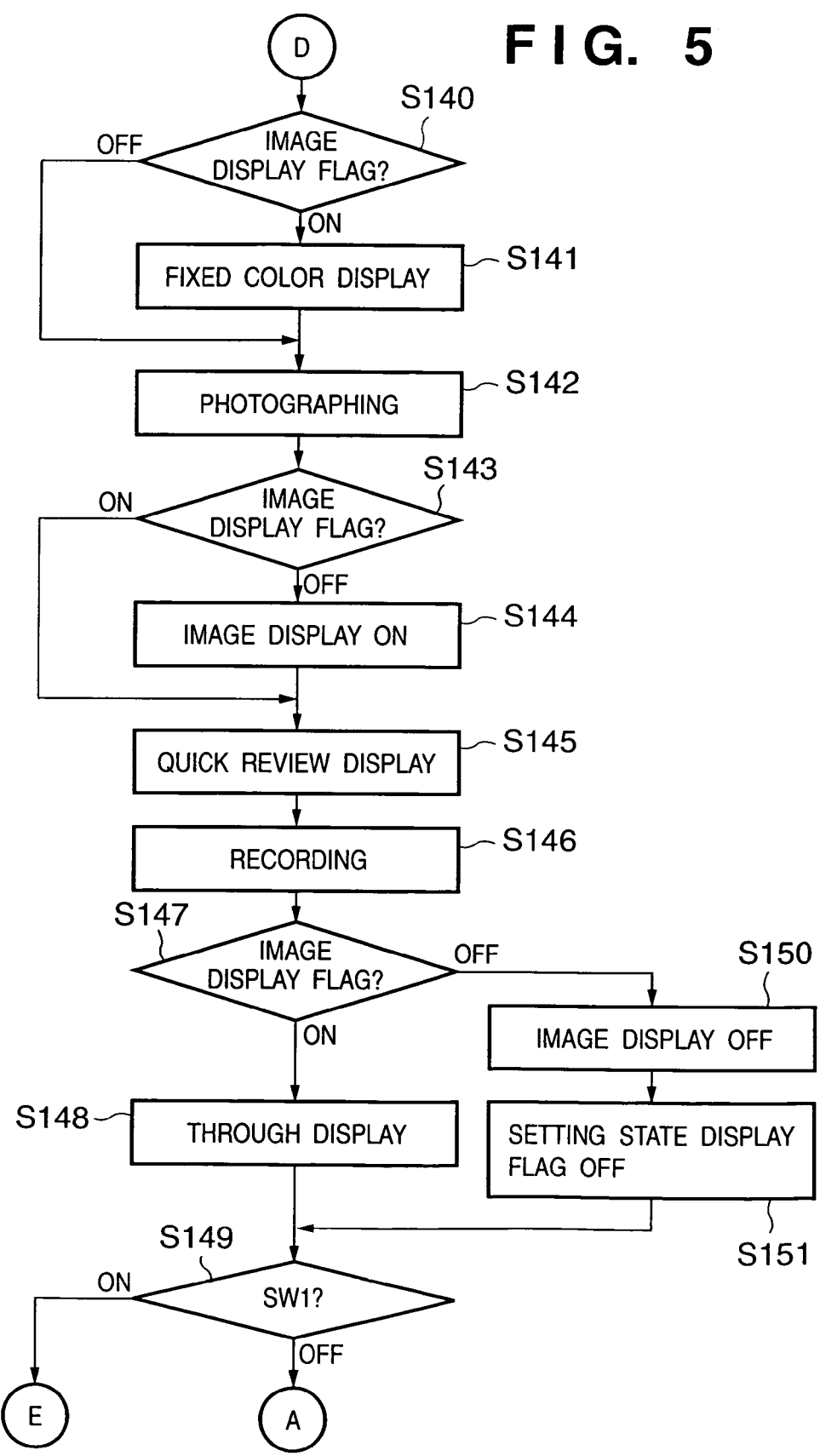

In the following step S131 of FIG. 4, the system control circuit 50 determines whether or not the shutter switch (SW1) 62 is on. If it is determined that SW1 is not on as a result of the determination, the system control circuit 50 determines whether or not the image display flag is set at ON (step S152). If it is determined that the image display flag is set at ON as a result of the determination, the system control circuit 50 executes light measurement processing (step S153) and the AWB processing (step S154), and the processing returns to the step S102 of FIG. 2. On the other hand, if it is determined that the image display flag is not set at ON, the processing returns to the step S102 immediately.

If it is determined that the shutter switch (SW1) 62 is on as a result of the determination of the step S131, the system control circuit 50 executes the light measurement processing (step S132). Further, in the light measurement processing, flash is also set if necessary. Then, the system control circuit 50 determines whether or not the image display flag is set at ON (step S133). If it is determined that the image display flag is set at ON as a result of the determination, the processing advances to step S135. On the other hand, if it is determined that the image display flag is not set at ON, the system control circuit 50 performs the image sensing driving mode switching processing (step S134), then the process advances to the step S135. In this image sensing driving mode switching processing, the driving mode of the timing generating circuit 18 is switched from a "normal reading mode" to a "partial reading mode". These driving modes will be described.

Figure 6:
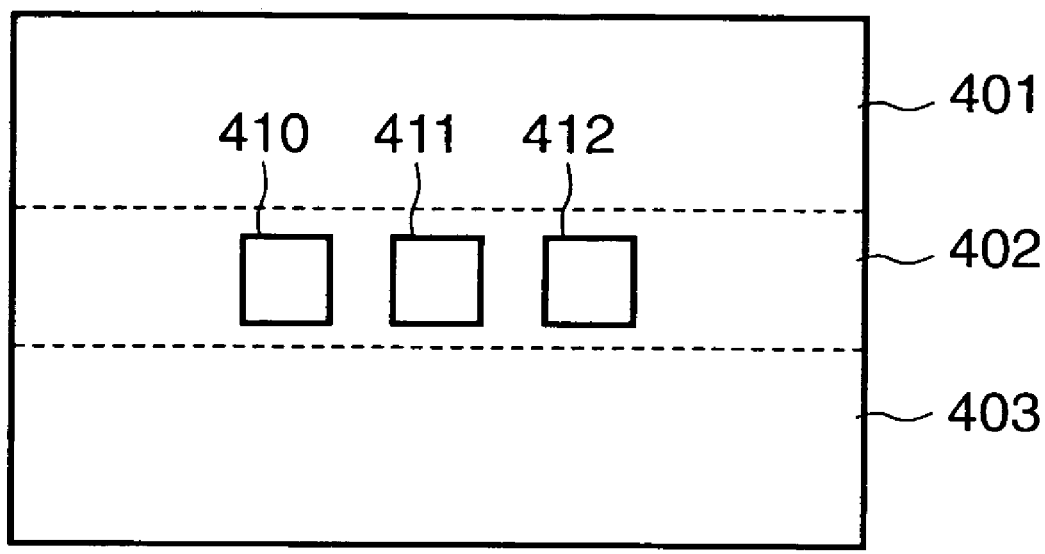
FIG. 6 illustrates an image sensing area of an image sensing device corresponding to a display screen of one frame of a sensed image.

FIG. 6 shows an image sensing area of an image sensing device, which corresponds to a display screen of one frame of a sensed image.

In the distance measurement processing, a high frequency component of a luminance signal obtained form the image sensing element 14 is obtained as a focus evaluating value, and a lens position indicating, for example, a maximum value of this focus evaluating value is regarded as a focusing point to perform focus adjustment. In that case, as shown in the figure, a part of an area of the screen is assumed to be distant measurement frames 410, 411 and 412. In the normal reading out mode, a signal is read out from the entire image sensing area. A sensed image is displayed on the image display 28 based on the read out signal and a focus evaluating value is obtained based on the signal. That is, the normal reading out mode is a mode for performing photographing while displaying a sensed image on the image display 28.

On the other hand, in the partial reading out mode, a signal is read out as usual only from a central area 402 where the focusing signed detecting areas 410, 411 and 412 are included, and high speed sweep off is performed for an upper area 401 and a lower area 403 shown in the figure. Thus, a focus evaluating value for one screen is obtained at high speed. That is, the partial reading out mode is a mode for performing photographing without displaying a sensed image on the image display 28. The partial reading out mode requires less image sensing area to be an object of processing for obtaining a focus evaluating value compared with the normal reading out mode. As a result, burdens of processing are reduced.

Figure 7:
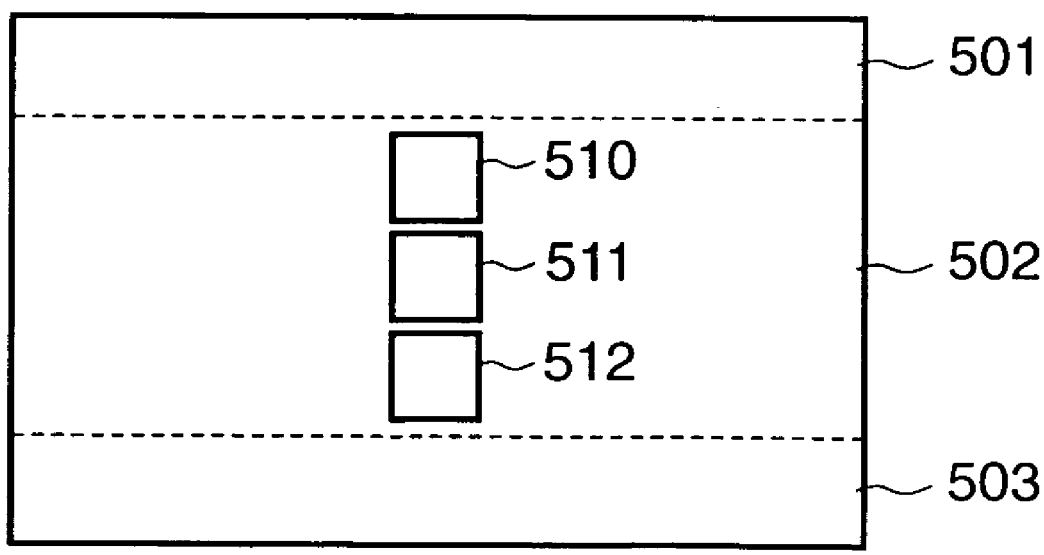
FIG. 7 illustrates an image sensing area of an image sensing device corresponding to a display screen of one frame of a sensed image.

Further, in the case in which the image processing apparatus 100 is used lengthwise, a high speed sweep off area in the partial reading out mode is also changed. That is, as shown in FIG. 7, a signal is read out as usual only from a central area 502 including focusing signed detecting areas 510, 511 and 512, and high speed sweep off is performed for an upper area 501 and a lower area 503 shown in the figure.

Referring to FIG. 4 again, in the following step S135, the distance measurement processing is performed in a set driving mode, and the focus of the photographing lens 10 is on a subject. Subsequently, the system control circuit 50 determines whether or not the image display flag is set at ON (step S136). If it is determined that the image display flag is set at ON as a result of the determination, the processing advances to step S138. On the other hand, if it is determined that the image display flag is not set at ON, the system control circuit 50 performs the image sensing driving mode switching processing (step S137), and then the processing advances to step S138. In this image sensing driving mode switching processing, the driving mode of the timing generation circuit 18 is switched from the "partial reading out mode" to the "normal reading out mode".

In the following step S138, the system control circuit 50 determines whether or not the shutter switch (SW2) 64 is turned on. If it is determined that SW2 is not turned on as a result of the determination, the system control circuit 50 determines whether or not the shutter switch (SW1) 62 is turned on (step S139). If it is determined that SW1 is not turned on (released) as a result of the determination, the processing returns to the step S102. On the other hand, if it is determined that SW1 is turned on (maintaining the on state), the processing returns to the step S138. On the other hand, if it is determined that the shutter switch (SW2) 64 is turned on as a result of the determination of the step S138, the system control circuit 50 determines whether or not the image display flag is set at ON (step S140 of FIG. 5).

If it is determined that the image display flag is set at ON as a result of the determination, the system control circuit 50 sets the display state of the image display 28 at a fixed color display state (step S141), and the processing advances to step S142. On the other hand, if the image display flag is set at ON, the processing advances to the step S142 immediately. In this fixed color display state, replaced fixed color image data is displayed by the image display 28 via the memory control circuit 22 and the D/A converter 26 instead of the sensed image data to be written in the image display memory 24 via the image sensing device 14, the A/D converter 16, the image processing circuit 20 and the memory control circuit 22. Thus, a fixed color image is displayed.

In the following step S142, the photographing processing is executed. That is, the system control circuit 50 performs exposure processing for writing photographed image data in the memory 30 via the image sensing device 14, the A/D converter 16, the image processing circuit 20 and the memory control circuit 22, or via the memory control circuit 22 directly from the A/D converter 16, and development processing for reading out the image data written in the memory 30 using the memory control circuit 22 and, if necessary, the image processing circuit 20 to perform various kinds of processing.

Subsequently, the system control circuit 50 determines whether or not an image display flag is set at ON (step S143). If it is determined that the image display flag is not set at ON as a result of the determination, the system control circuit 50 brings the image display 28 to the image display on state (step S144), and the processing advances to step S145. On the other hand, if it is determined that the image display flag at ON, the processing advances to step S145 immediately.

In step S145, quick review display is executed. If the step S144 is skipped, the image display 28 is in the state in which the image display 28 always displays a photographed image as an electronic finder, and quick review display immediately after photographing is also performed. On the other hand, if the processing gets through the step S144, the photographed image is displayed as a quick review for the first time immediately after photographing.

Subsequently, recording processing of the sensed image data is executed (step S146). That is, the system control circuit 50 reads out the sensed image data written in the memory 30, applies various kinds of image processing to the read out image data using the memory control circuit 22 and, if necessary, the image processing circuit 20, and further applies the image compression processing to the image data according to a set mode using the compression and extension circuit 32, thereafter writes the image data in the recording medium 200 or the recording medium 210.

Subsequently, the system control circuit 50 determines whether or not the image display flag is set at ON (step S147). If it is determined that the image display flag is set at ON as a result of the determination, the system control circuit 50 sets the display state of the image display 28 at a through display state (step S148), and the processing advances to step S149. In this through display state, a sensed image is confirmed by the quick review display in the image display 28, then image data sensed for the next photographing is sequentially displayed.

On the other hand, if it is determined that the image display flag is not set at ON as a result of the determination of the step S147, the system control circuit 50 sets the image display 28 at the image display off state (step S150) and sets the setting state display flag at ON (step S151), and the processing advances to the step S149.

In the following step S149, the system control circuit 50 determines whether or not the shutter switch (SW1) 62 is turned on. If it is determined that the SW1 is turned on as a result of the determination, the processing returns to the step S138 and the system control circuit 50 prepares for the next photographing. On the other hand, if SW1 is not turned on (released), a series of photographing operation ends, and the processing returns to the step S102.

According to this processing, in photographing in the case in which an image display flag is set at ON, a sensed image is displayed on the image display 28 in the through display state(step S120), and the distance measurement processing (step S135) is performed in the normal reading out mode. On the other hand, photographing in the case in which the image display flag is not set at ON, although a setting state is once displayed on the image display 28, the through display of the sensed image is not performed and the distance measurement processing is performed in the partial reading out mode.

According to this embodiment, in the case in which photographing is performed without displaying a sensed image, a focus evaluating value is obtained only from a signal in a central area including focusing signed detecting area by the partial reading out mode. Thus, a signal to be an object of reading out is limited, and as a result, burdens of processing are reduced and focus adjustment processing is performed promptly. Therefore, a shutter time lag can be shortened by reducing burdens of focusing processing at the time of photographing that does not require image display.

In addition, in the case in which photographing is performed while a sensed image is displayed, a focus evaluating value is obtained by the normal reading out mode. Thus, a signal of an entire area to be an object of image display is read out. Therefore, display of an appropriate sensed image can be secured by avoiding freeze or the like of a screen.

In addition, even with the partial reading out mode, since a reading out is an area including focusing signed detecting areas, accuracy of obtaining a focus evaluating value is never inferior.

In addition, with the partial reading out mode, prompt processing is secured without displaying a sensed image until photographing processing is completed, but the sensed image is displayed by quick review display for the next photographing after completing the photographing processing. Thus, convenience of use can be improved without preventing shortening of a shutter lag time.

As described above, according to this embodiment, a shutter lag time can be shortened by reducing burdens of focusing processing at the time of photographing that does not require image display.

In addition, it is possible to secure display of an appropriate sensed image by avoiding freeze or the like of a screen at the time of photographing that requires image display.

Further, it is needless to mention that the objects of the present invention can also be attained by supplying a storage medium in which a program code of software for realizing the above-mentioned function of each embodiment is supplied to an image sensing apparatus (the image processing apparatus 100), and a computer (or a CPU or an MPU) (the system control circuit 50) of the image sensing apparatus reads out and executes the program code stored in a storage medium.

In this case, the program code itself read out from the storage medium realizes the new function of the present invention, thus, the storage medium storing the program code constitutes the present invention.

As a storage medium for supplying a program code, for example, a floppy disk, a hard disk, an optical disk, an photomagnetic disk, a CD-ROM, a CD-R, a magnetic tape, a nonvolatile memory card, a ROM or the like can be used.

In addition, it is needless to mention that this embodiment includes the case in which the above-mentioned function of each embodiment is realized not only by executing a program code read out by a computer but also by performing a part of or the entire actual processing performed by an OS or the like running on the computer based on an instruction of the program code.

Moreover, it is needles to mention that this embodiment includes the case in which a program code read out from a storage medium is written in a memory provided in a function extension unit connected to a computer or a function extension board inserted in the computer, then based on an instruction of the program code, a CPU or the like provided in the function extension board and a function extension unit performs a part of or the entire actual processing, thus the function of the embodiment is realized.

As many apparently widely different embodiments of the present invention can be made without departing from the spirit and scope thereof, it is to be understood that the invention is not limited to the specific embodiments thereof except as defined in the claims.

What is claimed is:

1. An image sensing apparatus, comprising:
   an image sensor that outputs an image signal of a subject;

a display designating unit that determines whether an image display device is in an image display ON state, or said image display device is in an image display OFF state, said image display device displaying an image based on said image signal when said display device is in the image display ON state and said image display device not displaying an image when said display device is in the image display OFF state;

a first control unit that adjusts a focus according to a focus evaluation value based on a high frequency component of said image signal, and a second control unit that changes reading manners of the image signal from said image sensor so that the image signal is read from a first image sensing area comprising a plurality of consecutive lines and including a focusing signed detecting area when said display designating unit determines that said image display device is in the image display OFF state and the image signal is read from a second image sensing area which is larger than said first image sensing area when said display designating unit determines that said image display device is in the image display ON state.

2. The image sensing apparatus according to claim 1, wherein said second control unit sweeps off the image signal in an entire image sensing area not including said first image sensing area at high speed when said display designating unit determines that said image display device is in the image display OFF state.

3. The image sensing apparatus according to claim 1, further comprising:

a display prohibiting device that prohibits display of said image by said image display device at least until photographing processing is completed if said display designating unit determines that said image is displayed by said image display device while said image sensing apparatus photographs said image signal.

4. The image sensing apparatus according to claim 1, wherein determination by said display designating unit is stored in a memory as an image display flag.

5. A control method of an image sensing apparatus, comprising:

an image sensing step by an image sensor that outputs an image signal of a subject;

a display designating step by a display designating unit that determines whether an image display device is in an image display ON state or said image display device is in an image display OFF state, said image display device displaying an image based on said image signal when said display device is in the image display ON state and said image display device not displaying an image when said display device is in the image display OFF state;

a first control step by a first control unit that adjusts a focus according to a focus evaluation value based on a high frequency component of said image signal, and a second control step by a second control unit that changes reading manners of the image signal from said image sensor so that the image signal is read from a first image sensing area comprising a plurality of consecutive lines and including a focusing signed detecting area when in said display designating step said display designating unit determines that said image display device is in the image display OFF state and the image signal is read from a second image sensing area which is larger than said first image sensing area when in said display designating step said display designating unit determines that said image display device is in the image display ON state.

6. The control method of an image sensing apparatus according to claim 5, wherein in said second control step said second control unit sweeps off the image signal in an entire image sensing area not including said first image sensing area at high speed when in said display designating step said display designating unit determines said image display device is in the image display OFF state.

7. The control method of an image sensing apparatus according to claim 5, further comprising:

a display prohibiting step that prohibits display of said image by said image displaying step at least until photographing processing is completed if said display designating step determines that said image is displayed by said image displaying step while said image sensing apparatus photographs said image signal.

8. The control method of an image sensing apparatus according to claim 5, wherein determination by said display designating step is stored in a memory as an image display flag.

9. A storage medium in which a control program for controlling an image sensing apparatus is stored, wherein said control program comprising codes that, when executed, causes a computer to carry out the steps of:

an image sensing step by an image sensor that obtains an image signal by sensing an image of a subject;

a display designating step by a display designating unit that determines whether an image display device is in an image display ON state, or said image display device is in an image display OFF state, said image display device displaying an image based on said image signal when said display device is in the image display ON state and said image display device not displaying an image when said display device is in the image display OFF state;

a first control step by a first control unit that adjusts a focus according to a focus evaluation value based on a high frequency component of said image signal, and a second control step by a second control unit that changes reading manners of the image signal from said image sensor so that the image signal is read from a first image sensing area comprising a plurality of consecutive lines and including a focusing signed detecting area when in said display designating step said display designating unit determines that said image display device is in the image display OFF state and the image signal is read from a second image sensing area which is larger than said first image sensing area when in said display designating step said display designating unit determines that said image display device is in the image display ON state.

* * * * *